C. A. WIDMER.
BELT SHIFTING APPARATUS.
APPLICATION FILED APR. 24, 1918.
1,288,338.
Patented Dec. 17, 1918.
3 SHEETS—SHEET 1.
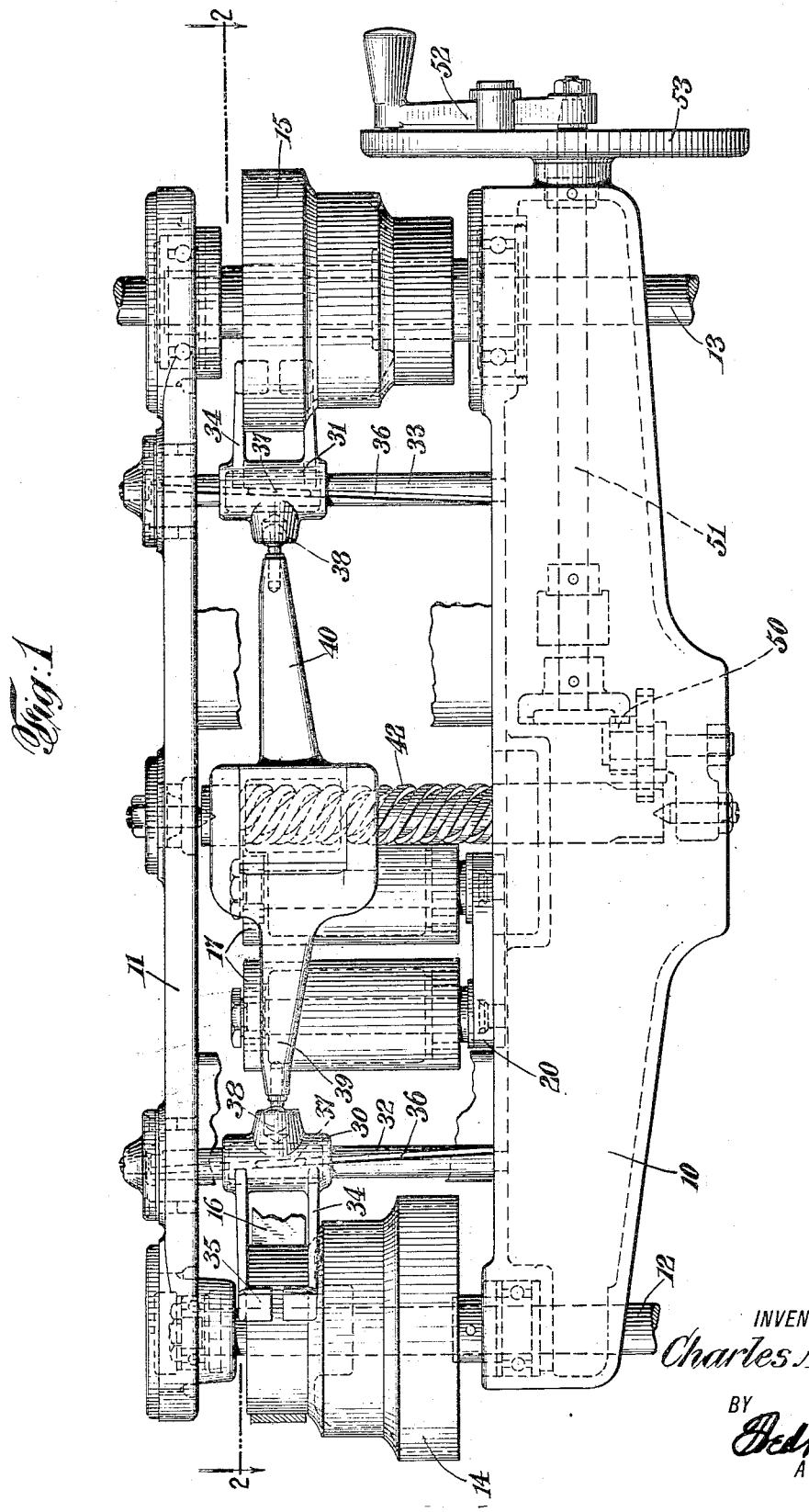
INVENTOR
Charles A. Widmer
BY
ATTORNEY C. A. WIDMER.
BELT SHIFTING APPARATUS.
APPLICATION FILED APR. 24, 1918.
1,288,338.
Patented Dec. 17, 1918.
3 SHEETS—SHEET 2.
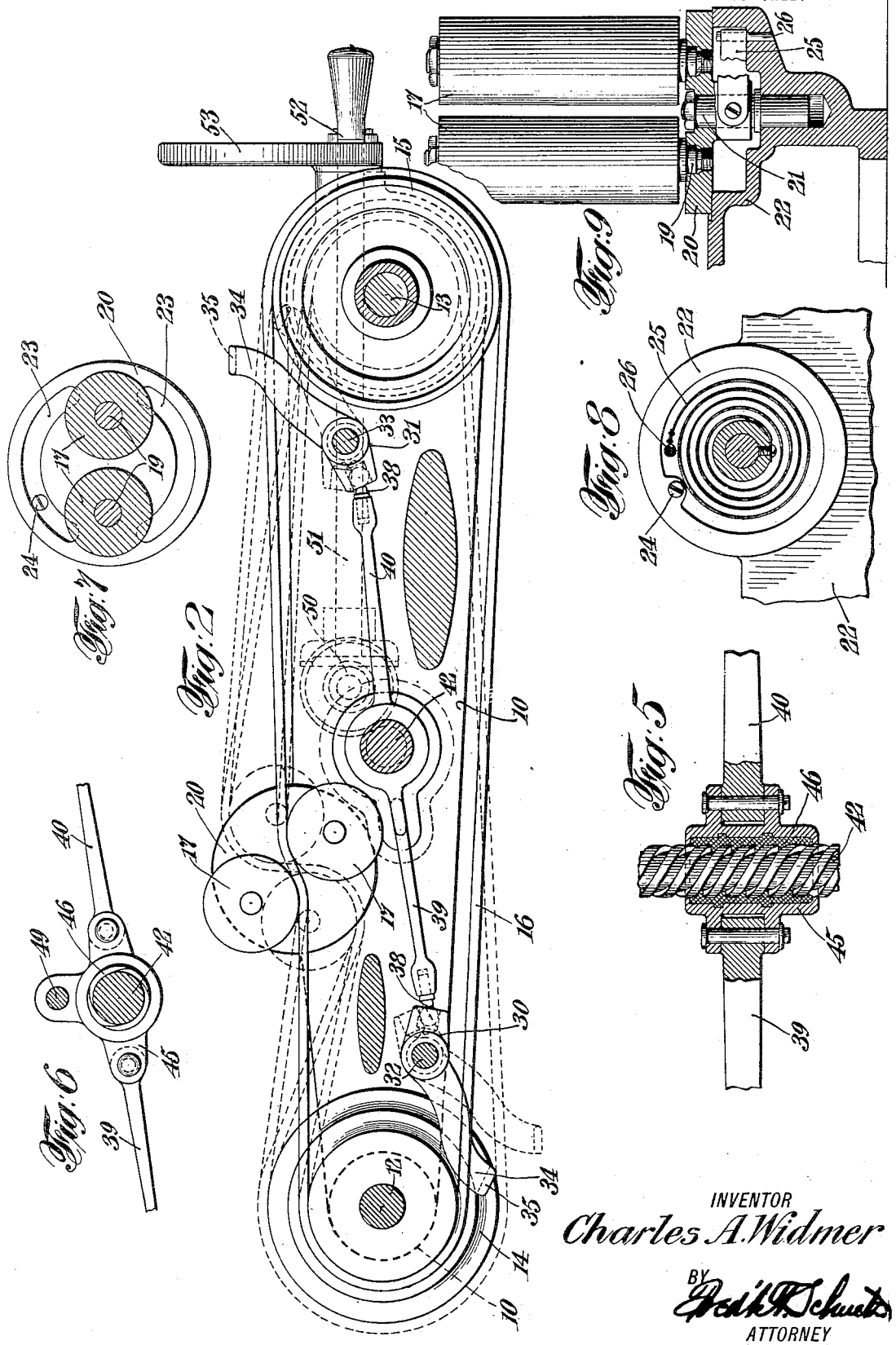
INVENTOR
Charles A. Widmer
BY
ATTORNEY

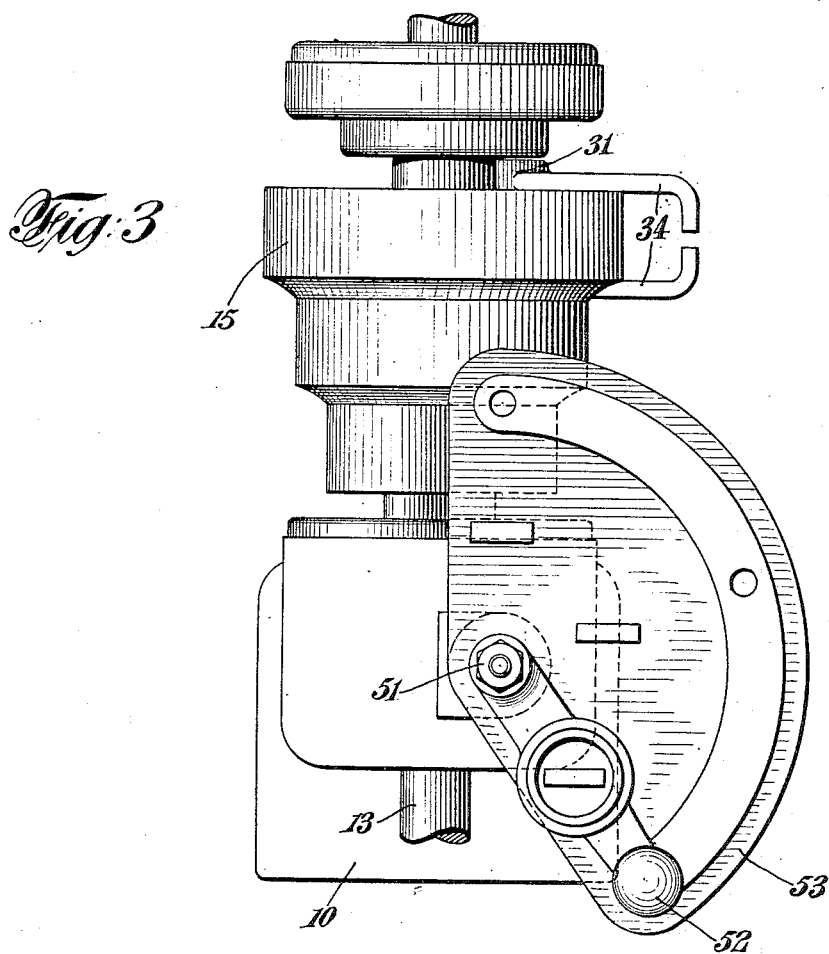
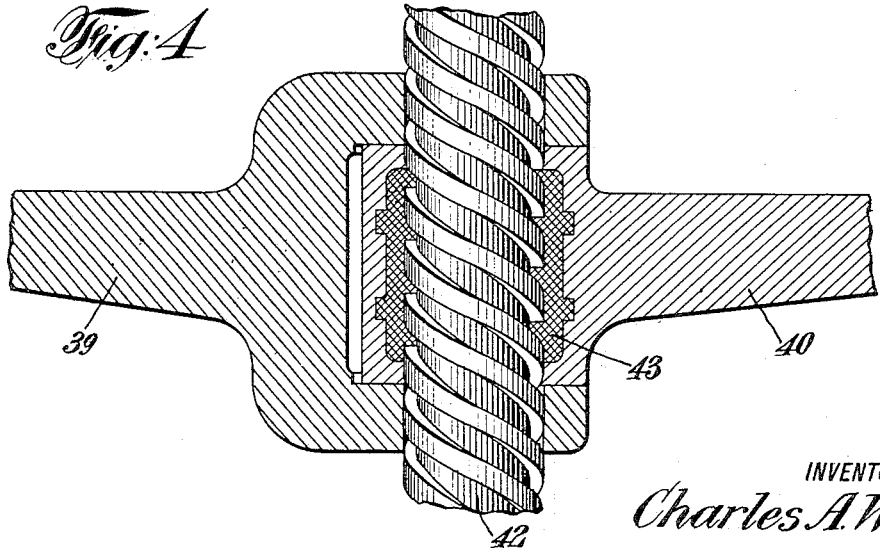

UNITED STATES PATENT OFFICE.

CHARLES A. WIDMER, OF PATERSON, NEW JERSEY.

BELT-SHIFTING APPARATUS.

1,288,338.    Specification of Letters Patent.    Patented Dec. 17, 1918.

Application filed April 24, 1918. Serial No. 230,550.

*To all whom it may concern:*

Be it known that I, CHARLES A. WIDMER, a citizen of the United States, and a resident of Paterson, in the county of Passaic and State of New Jersey, have invented certain new and useful Improvements in Belt-Shifting Apparatus, of which the following is a specification.

The invention relates to apparatus for effecting the shifting of a belt from one step of its speed pulleys or cones to another, particularly while the same are in operation; and it has for its object to provide means of this character which will insure against the turning over of the belt in the shifting operation, and to secure a positive and instantaneous shift thereof. This object is attained by mechanism hereinafter described, and arranged to operate close to the pulley periphery in all of the stages. The invention comprehends, furthermore, a novel form of tensioned idler, or rather pair of idlers, coöperating with the belt, and wherein the usual swinging arm is dispensed with. The novel idler assists greatly in the shifting of the belt; and to further facilitate the same, the wall portions between successive pulleys of a set are slightly concaved.

In the accompanying drawings, which illustrate the invention—

Figure 1 is a side elevation of the apparatus.

Fig. 2 is a horizontal section taken on the line 2—2, Fig. 1.

Fig. 3 is a front elevation.

Fig. 4 is a detail sectional view illustratting the manner of hinging the lever arms of the shipper, and shows also the operating screw for said arms.

Fig. 5 is a similar view illustrating a modification; and Fig. 6 is a plan thereof.

Figs. 7 to 9 are detail views of the improved tensioned idlers.

Similar characters of reference designate corresponding parts throughout the several views.

Referring to the drawings, the mechanism is shown supported in a suitable frame, between two separated portions 10 and 11 of which are rotatably mounted the driving shaft 12 and the tool spindle 13. To each of these is secured speed cones 14 and 15 of the desired number of steps, three being herein shown. Power is transmitted from the former to the latter through a belt 16, at one side of which it is acted upon by two idlers 17 so disposed as to contact with the opposite faces thereof, and having their axes displaced in the direction of the travel of the belt. These idlers are designed to take up, automatically, any slack developing in the belt, and particularly during the shifting of same, to assist simultaneously at both pulleys by permitting the belt to yield as it passes over the high points of the said pulleys—the normal and extreme positions which the belt may assume being indicated respectively in full lines and in dotted lines, Fig. 2. Moreover, it is preferred to slightly concave the wall portions between successive pulleys of a set, and thereby give the belt a more rapid start in shifting through a momentary release of the tension of the idlers upon the said belt.

The construction of the idlers embodies certain novel features, and is set forth more particularly in Figs. 7 to 9. The two idlers 17, between which passes the belt 16, are designed to move in unison, or rather to oscillate in opposite directions about a common axis; and, to this end, are rotatably secured on suitable axles having studs 19 screwed into a swivel plate or support 20. This plate is rotatably secured upon a stud 21 mounted in a head or frame piece 22 attached to the frame portion 11. This arrangement will permit the plate 20 to oscillate about the stud 21 as well as to allow the idlers 17, mounted thereon, to assume the proper positions relatively to the belt. Arcuate slots 23 are provided, moreover, in the plate 20, and are adapted to receive a corresponding stop screw 24 extending therein from the head 22 to limit the oscillations of said plate and idlers thereon. In order to insure the desired tension, one end of a spring 25 is suitably secured to the hub of plate 20, and the other anchored to a pin 26 of the head 22, said spring being coiled a number of times about the stud. To change the tension upon the idlers, it is necessary merely to temporarily remove screw 24 from the slot 23, wind up the spring by rotating the swivel plate a number of times, and then replace the stop screw 24 in one or the other of the slots 23. The arrangement hereinbefore described affords a simple and highly efficient idler device for providing and maintaining the desired tension upon the belt, accommodating itself automatically to variations in the length of said belt, as well as assisting in the shifting of the latter.

To effect the shifting of the belt from one cone to the next, suitable shippers 30 and 31 are mounted to reciprocate, as well as to oscillate, in manner hereinafter set forth, on corresponding rods 32 and 33, whose axes are parallel to the shaft 12 and spindle 13. The shippers, moreover, are provided with arms 34 extending outwardly to embrace the belt, and which have inwardly directed fingers 35 extending over the surface of said belt to lock the latter within the shipper. The rods 32 and 33, moreover, are provided with a spiral groove 36, the one being directed reversely of the other, and each having working therein a suitable key 37 or the like directed inwardly from a shipper, whereby, as the latter is reciprocated on its rods, the arms 34 thereof will be correspondingly swung to remain in close proximity to the periphery of the particular pulley to which the belt is shifted.

In order to effect the desired reciprocation of the shippers 30 and 31, there is flexibly secured to each, as by means of an universal joint or flexible connection 38, levers 39 and 40 which extend inwardly and are mounted about a common and movable fulcrum midway between the rods 32 and 33. The particular manner of mounting these levers is shown in detail in Fig. 4, the lever 39 being bifurcated or forked to receive the lever 40, and both being provided with smooth registering openings through which passes a screw 42, whose axis is parallel to the rods 32 and 33. The latter lever 40, however, retains and is movable with, a nut 43 preferably of Babbitt metal cast into the said lever and provided with suitable threads to engage the screw 42. In this manner, when the said screw is rotated, both of the levers 39 and 40 will be reciprocated along the axis of said screw and correspondingly effect reciprocation of the shippers 30 and 31. It will be noted, moreover, that the connection of the two levers 39 and 40 to the screw 42 constitutes substantially a hinged joint which will permit of the arms oscillating about the axis of said screw under the influence of the spiral grooves 36 to accommodate the resulting oscillation due to the movement of said shippers. In Fig. 5, a slight modification has been illustrated in the connection of the levers to the screw, in that a block 45 provided with nut 46, similar to the nut 43, is mounted about said screw and reciprocated thereby. The lever arms 39 and 40, in this modification, are pivotally secured to the block 45; and in order to prevent rotation of the latter, the same is designed to reciprocate upon a guide rod 49 fixed between the frame portions 10 and 11, the operation of the mechanism being otherwise precisely similar to that previously described.

Screw 42 may be rotated in any convenient manner to obtain the desired reciprocation of the lever arms; and, in the present embodiment, obtains its rotation through intermediate mechanism 50 from an actuating shaft 51 mounted in the frame and carrying at the front of the machine a suitable crank or handle 52, adapted to move over a control plate or dial 53 to assume a plurality of positions corresponding to the predetermined possible speed variations.

In this manner, a very simple and effective shifting apparatus is afforded, which is compact and positive in its operation and insured against defective action through overturning of the belt and other causes.

I claim:

1. In belt shifting apparatus, including a drive shaft and stepped pulley thereon, a tool spindle and stepped pulley thereon, and a belt to transmit power from one to the other: means to simultaneously shift the belt at each pulley from one step to a succeeding one thereof, comprising belt shippers to engage said belt at each of the pulleys; and means to reciprocate said shippers and simultaneously therewith oscillate the same.

2. In belt shifting apparatus, including a drive shaft and stepped pulley thereon, a tool spindle and stepped pulley thereon, and a belt to transmit power from one to the other: means to simultaneously shift the belt at each pulley from one step to a succeeding one thereof, comprising belt shippers to engage said belt at each of the pulleys; and means to reciprocate said shippers and simultaneously therewith oscillate the same at right angles to the direction of their shipping movement.

3. In belt shifting apparatus, including a drive shaft and stepped pulley thereon, a tool spindle and stepped pulley thereon, and a belt to transmit power from one to the other: means to shift the belt from one step to a succeeding one, comprising belt shippers to engage said belt at each of the pulleys; and means to reciprocate said shippers and simultaneously therewith oscillate the same, and including oppositely-directed arms flexibly united to said shippers, and means to reciprocate said arms.

4. In belt shifting apparatus, including a drive shaft and stepped pulley thereon, a tool spindle and stepped pulley thereon, and a belt to transmit power from one to the other: means to shift the belt from one step to a succeeding one, comprising belt shippers to engage said belt at each of the pulleys; and means to reciprocate said shippers and simultaneously therewith oscillate the same, and including oppositely-directed levers flexibly united to said shippers, and having a common movable fulcrum, and means to move said fulcrum.

5. In belt shifting apparatus, including a drive shaft and stepped pulley thereon, a tool spindle and stepped pulley thereon, and a belt to transmit power from one to the other: means to shift the belt from one step to a succeeding one, comprising belt shippers to engage said belt at each of the pulleys; and means to reciprocate said shippers and simultaneously therewith oscillate the same, and including oppositely-directed levers flexibly united to said shippers, a rotatable screw engaging said levers, and means to rotate said screw to reciprocate the said levers.

6. In belt shifting apparatus, including a drive shaft and stepped pulley thereon, a tool spindle and stepped pulley thereon, and a belt to transmit power from one to the other: means to shift the belt from one step to a succeeding one, comprising belt shippers to engage said belt at each of the pulleys; a rotatable screw, and means to rotate the same; levers hingedly united about said screw and adapted to be reciprocated thereby; and a universal joint connecting said levers with said shippers.

7. In belt shifting apparatus, including a drive shaft and stepped pulley thereon, a tool spindle and stepped pulley thereon, and a belt to transmit power from one to the other: means to shift the belt from one step to a succeeding one, comprising belt shippers engaging said belt at each of the pulleys; guide rods upon which the same are reciprocable, said rods being provided with a spiral groove; means extending from a shipper to engage the corresponding groove of its guide rod and effect an oscillation of the shipper thereon; and means to reciprocate said shippers.

8. In belt shifting apparatus, including a drive shaft and stepped pulley thereon, a tool spindle and stepped pulley thereon, and a belt to transmit power from one to the other: means to shift the belt from one step to a succeeding one, comprising belt shippers engaging said belt at each of the pulleys; guide rods upon which the same are reciprocable, said rods being provided with a spiral groove, the groove of one rod being directed reversely to that of the other; means extending from a shipper to engage the corresponding groove of its guide rod and effect an oscillation of the shipper thereon; and means to reciprocate said shippers.

9. In belt shifting apparatus, including a drive shaft and stepped pulley thereon, a tool spindle and stepped pulley thereon, and a belt to transmit power from one to the other: means to shift the belt from one step to a succeeding one, comprising belt shippers at each of the pulleys, having arms embracing the belt, and the arms having fingers inwardly directed thereover; guide rods upon which the same are reciprocable, said rods being provided with a spiral groove, the groove of one rod being directed reversely to that of the other; means extending from a shipper to engage the corresponding groove of its guide rod and effect an oscillation of the shipper thereon; and means to reciprocate said shippers.

10. In belt shifting apparatus, including a drive shaft and stepped pulley thereon, a tool spindle and stepped pulley thereon, and a belt to transmit power from one to the other: means to shift the belt from one step to a succeeding one, comprising belt shippers to engage said belt at each of the pulleys; means to reciprocate said shippers and simultaneously therewith oscillate the same, and including oppositely-directed levers flexibly united to said shippers, and a rotatable screw engaging said levers; an oscillatory shaft and intermediate mechanism to communicate the motion of same to the said screw; a crank handle upon said shaft to effect oscillation thereof; and a suitable dial or control plate to determine the particular position of the belt with reference to the speed pulleys.

11. In belt shifting apparatus, including a drive shaft and stepped pulley thereon, a tool spindle and stepped pulley thereon, and a belt to transmit power from one to the other: belt shippers engaging said belt at each of the pulleys; guide rods upon which the same are reciprocable; levers flexibly united midway of said rods and their ends flexibly united to said shippers; and a rotatable screw engaging said levers to reciprocate and oscillate said shippers.

12. In belt shifting apparatus; a suitable frame; a drive shaft located at one end thereof and stepped pulley thereon, and a tool spindle located at the opposite end and stepped pulley thereon; a belt to transmit power from one pulley to the other; rods mounted in said frame between said drive shaft and tool spindle, and parallel to the axes thereof, said rods being provided with reversely directed spiral grooves; a rotatable screw mounted midway of said rods and parallel to the axes thereof; levers flexibly mounted about said screw to be reciprocated thereby and extending in opposite directions therefrom; and belt shippers mounted to reciprocate on said rods, extending in one direction to engage the corresponding belt portions, and in the opposite direction to be flexibly united to the said levers, whereby, when the latter are reciprocated, the said shippers are correspondingly reciprocated and also oscillated upon said rods.

13. In belt shifting apparatus, including a drive shaft and stepped pulley thereon, a tool spindle and stepped pulley thereon, and a belt to transmit power from one to the other; means to simultaneously shift the belt at each pulley from one step to a succeeding one thereof; a pair of idlers between which said belt passes, said idlers being rotatably mounted to simultaneously oscillate and act upon opposite faces of the belt, and during the operation of shifting to permit of slackening said belt; and means to provide suitable tension on said idlers.

14. In belt shifting apparatus, including a drive shaft and stepped pulley thereon having intermediate concaved wall portions, a tool spindle and stepped pulley thereon having intermediate concaved wall portions, and a belt to transmit power from one to the other; means to shift the belt from one step to another and simultaneously at each end.

15. In belt shifting apparatus, including a drive shaft and stepped pulley thereon having intermediate concaved wall portions, a tool spindle and stepped pulley thereon having intermediate concaved wall portions, and a belt to transmit power from one to the other; means to shift the belt from one step to another and simultaneously at each end; and yielding means to continuously maintain the belt intension.

Signed at New York in the county of New York and State of New York this 17th day of April, A. D. 1918.

CHARLES A. WIDMER.